United States Patent
Varming

(10) Patent No.: US 7,792,408 B2
(45) Date of Patent: Sep. 7, 2010

(54) METHOD OF INDUCING REFRACTIVE INDEX STRUCTURES IN A MICRO-STRUCTURED FIBER, A MICRO-STRUCTURED FIBER AND AN ARTICLE

(75) Inventor: Poul Varming, Copenhagen (DK)

(73) Assignee: NKT Photonics A/S, Birkerod (DK)

( * ) Notice: Subject to any disclaimer, the term of this patent is extended or adjusted under 35 U.S.C. 154(b) by 745 days.

(21) Appl. No.: 11/573,401

(22) PCT Filed: Aug. 24, 2005

(86) PCT No.: PCT/EP2005/054158

§ 371 (c)(1),
(2), (4) Date: Feb. 8, 2007

(87) PCT Pub. No.: WO2006/021569

PCT Pub. Date: Mar. 2, 2006

(65) Prior Publication Data

US 2009/0238215 A1    Sep. 24, 2009

(30) Foreign Application Priority Data

Aug. 25, 2004  (DK) .......................... PA 2004 01283

(51) Int. Cl.
*G02B 6/00* (2006.01)
(52) U.S. Cl. ........................................ 385/147; 385/37
(58) Field of Classification Search .................. None
See application file for complete search history.

(56) References Cited

U.S. PATENT DOCUMENTS

| | | | |
|---|---|---|---|
| 5,235,659 | A | 8/1993 | Atkins et al. |
| 5,907,652 | A | 5/1999 | DiGiovanni et al. |
| 6,151,429 | A | 11/2000 | Kristensen et al. |
| 6,366,722 | B1 | 4/2002 | Murphy et al. |
| 6,539,155 | B1 | 3/2003 | Broeng et al. |
| 2002/0121115 | A1 | 9/2002 | Carpenter et al. |
| 2003/0161599 | A1 | 8/2003 | Broderick et al. |
| 2009/0060438 | A1 * | 3/2009 | Mori et al. .................. 385/127 |

FOREIGN PATENT DOCUMENTS

| | | |
|---|---|---|
| EP | 1 426 795 A2 | 6/2004 |
| JP | 2002055240 A | 2/2002 |
| WO | 98/36300 A2 | 8/1998 |
| WO | 99/64903 A1 | 12/1999 |
| WO | 03/019257 A1 | 3/2003 |
| WO | 03/032039 A1 | 4/2003 |

OTHER PUBLICATIONS

PCT/ISA/210 for PCT/EP2005/054158 dated Dec. 13, 2005.
Bjarklev et al., "Photonic Crystal Fibres", Kluwer Academic Publishers, 2003, Chapter 4, pp. 115-130.
Eggleton et al., "Grating Resonances in Air-Silica Microstructured Optical Fibers", Optics Letters vol. 24 Issue 21, p. 1460.
Eggleton et al., "Cladding-ModeResonances in Air-Silica Microstructure Optical Fibres", Journal of Lightwave Technology, vol. 18, No. 8 (Aug. 2002) pp. 1084-1100.
Knight et al., "Photonic Band Gap Guidance in Optical Fibers", in Science, vol. 282, Nov. 20, 1998, pp. 1476-1478.
Birks et al. "2D photonic Band Gap Structures in Fibre Form", in Photonic Band Gap Materials, Ed. by C.M. soukoulis, Kluwer, 1996, pp. 1-8.
Raman Kashyap, Fiber Bragg Gratings, Academic Press, 1999 (ISBN 0-12-400560-8), Chapter 2, pp. 34-35.

* cited by examiner

*Primary Examiner*—Sung H Pak
(74) *Attorney, Agent, or Firm*—Buchanan Ingersoll & Rooney PC

(57) ABSTRACT

Refractive index modifications such as e.g. Fiber Bragg gratings in micro-structured Fiber are according to an aspect of the invention fabricated by first filling and/or purging the holes of the micro-structured fiber with inert gas or by evacuation and, optionally subsequently sealing the ends. Alternatively, the ends of the micro-structured fiber may be sealed without a preceding purging or evacuation of the holes. In this way hydrogen or deuterium present in the holes after photosensitizing loading will not react with atmospheric oxygen to form water. Water formed this way would otherwise seriously impair the grating formation process. Bragg gratings and other refractive index structures can thus be fabricated with high quality and predictable specifications in micro-structured fiber. Sealing the fiber ends also prevents in-diffusion of moisture. The invention may e.g. find application in connection with fiber optical sensors, high-power fiber lasers, etc.

17 Claims, 2 Drawing Sheets

METHOD OF INDUCING REFRACTIVE INDEX STRUCTURES IN A MICRO-STRUCTURED FIBER, A MICRO-STRUCTURED FIBER AND AN ARTICLE

FIELD OF THE INVENTION

This invention relates to the introduction of refractive index modifications (e.g. the fabrication of fiber Bragg gratings) in micro-structured fibers also known as (photonic) crystal fibers or holey fibers.

BACKGROUND ART

Fiber Bragg gratings (FBG) and other refractive index structures in optical fiber have found widespread applications in such technology areas as optical telecommunications, optical fiber sensors, and optical fiber lasers (cf. e.g. Raman Kashyap, "Fiber Bragg gratings", Academic Press, 1999 (ISBN: 0-12-400560-8), referred to as [Kashyap] in the following and Andreas Othonos, Kyriacos Kalli, "Fiber Bragg gratings", Artech House, 1999 (ISBN: 0-89006-344-3), referred to as [Othonos, Kalli] in the following). The fabrication of FBG's involves illuminating the fiber with a spatially modulated pattern of actinic radiation (typically UV-laser light). This is typically established by interference between laser beams, e.g. by transmitting the actinic radiation through a phase mask. The process requires the fiber to be photo-sensitive such that its refractive index is modified under the influence of actinic radiation. Photo-sensitivity is often achieved by doping the fiber in or around the core with a sufficiently high concentration of germanium or other suitable dopant materials (cf. [Kashyap], [Othonos, Kalli]). However, often doping by itself does not provide sufficient photo-sensitivity. In such cases the photo-sensitivity can be enhanced considerably by in-diffusion of molecular hydrogen or deuterium (cf. U.S. Pat. No. 5,235,659, "Method of making an article comprising an optical waveguide"). This process, which is most often referred to as loading, is often carried out by subjecting the fiber to high pressures (P >>1 bar) for a sufficiently long time. The process can be accelerated by using elevated temperature.

This way the partial pressure of molecular hydrogen or deuterium in the doped section of the fiber can be brought to a level high enough that Ge and molecular hydrogen or deuterium react under the influence of e.g. UV-light to bring about the desired level of refractive index change.

At the same time, micro-structured fiber (or crystal fiber) has gained acceptance over recent years as a new and revolutionizing technology that opens new degrees of freedom in tailoring the guidance properties of optical fiber (cf. e.g. U.S. Pat. No. 6,539,155, "Microstructured optical fibres"). Micro-structured fiber is characterized by the presence of elongated cavities (or air holes) in the fiber. The geometry of the cavities (e.g. the cross-sectional size and distribution, and mutual centre-centre distances) defines the guidance properties of the fiber, and in principle no Ge or other dopant is needed for guidance. Thus a single material (e.g. pure silica) fiber can be constructed, and properties such as cut-off wavelength and dispersion can be designed to meet specifications that cannot be obtained by standard fiber fabrication methods. Another advantage of micro-structured fiber lies in the ability to produce air-clad optical fiber wherein the core is surrounded by an inner and an outer cladding and the inner and outer cladding are separated by a structure of air holes (cf. e.g. U.S. Pat. No. 5,907,652, "Article comprising an air-clad optical fiber").

The ring of air holes surrounding the inner cladding results in a high refractive index step or a high numerical aperture (typically around 0.6). This provides for an efficient coupling of pump light to the inner cladding. At the same time the pump light is detached from the polymer coating surrounding the outer cladding. The inner cladding can thus accommodate very high power levels of multiple spatial mode pump light—an essential building block for the fabrication of high power fiber lasers.

Specifically the combination of crystal fiber and fiber Bragg gratings opens new application possibilities. One example is the field of fiber optical sensors where gas or fluids can be guided through the hollow sections of the fiber and thus influence the reflective properties of FBG's. Another example is the field of high power fiber lasers, where air-clad optical fiber will allow for coupling of very high levels of pump power while FBG's act as cavity defining reflectors.

The process of imprinting FBG's in micro-structured fiber has however shown to pose a special problem, namely that it has been difficult to perform the UV-imprinting.

OBJECT AND SUMMARY

An object of the invention is thus to provide a method of producing refractive index structures in micro-structured fiber which method is improved, preferably in that the method does not have the drawbacks as described above.

The holes in a micro-structured fiber typically will be filled with atmospheric air containing the usual approximately 20% of oxygen. If such a fiber is loaded the fiber, including the holes, will further be provided with a partial pressure of molecular hydrogen or deuterium.

The inventor of the present invention has thus observed that formation or presence of water or moisture in the microstructure adversely affects further UV-imprinting and effectively makes it impossible to write quality gratings.

If oxygen is present in the micro-structured fiber and subjected to loading it has thus been found that under the influence of actinic radiation the oxygen and molecular hydrogen or deuterium may react to form water, $H_2O$ or $D_2O$. The method of the invention thus prevents the formation of water during grating writing or it prevents in-diffusion of water e.g. due to condensation.

A method of producing refractive index structures in a micro-structured fiber by illumination with actinic radiation is according to an aspect of the invention characterized in that the holes of the micro-structured fiber have been purged with a protection gas essentially free of oxygen and the ends sealed prior to photo-sensitizing loading.

A method of producing refractive index structures in micro-structured fiber by illumination with actinic radiation is according to an aspect of the invention characterized in that the ends of the holes in the micro-structured fiber have been sealed prior to processing by actinic radiation.

An object of the invention is achieved by a method of producing a refractive index structure in a micro-structured optical fiber by illumination with actinic radiation, the micro-structured fiber comprising elongated holes along at least a part of its length and having at least one open end where the holes are accessible, the method comprising the step of (a1) providing that the holes of the micro-structured fiber are purged with a protection gas essentially free of oxygen or providing that the holes are evacuated.

This has the advantage of removing atmospheric oxygen from the holes of the micro-structured fiber.

In an embodiment, the holes of the micro-structured fiber are purged with a protection gas by flushing said protecting gas through/or into the holes of the fiber.

In the present context the term 'evacuated' is taken to mean that the pressure in the holes of the micro-structured fiber is reduced to less than 0.5 atm., preferably less than 0.05 atm., preferably less than 0.005 atm., preferably less than 0.0005 atm., preferably less than 0.00005 atm. Thereby the partial pressure of oxygen is correspondingly reduced.

In a particular embodiment, the micro-structured optical fiber, having a length L, has two open ends, i.e. the elongated holes of the fiber extend over its full length and are accessible from both ends. Alliteratively, one of the ends has been initially sealed (leaving only one open end from which the holes are accessible) or the elongated holes do otherwise not extend over the full length of the fiber.

Preferably step (a1) is carried out prior to illumination with actinic radiation. Alternatively, step (a1) of purging the holes of the micro-structured fiber may be carried out during illumination with actinic radiation, thereby minimizing the formation of undesired reactants (such as water) during the process of forming the refractive index structure.

The term a protection gas being 'essentially free of oxygen' is in the present context taken to mean that the protection gas is suitable for removing any oxygen (e.g. atmospheric) present (e.g. by flushing the holes with the protection gas). In an embodiment, the protection gas contains less than 1% oxygen (mole concentration), such as less than 0.1% oxygen, such as less than 0.01% oxygen, such as less than 0.001% oxygen. 0.001% (mole concentration) oxygen corresponds to 10 ppm $O_2$.

In a particular embodiment, the method further comprises the step (a2) of providing that the open end or ends is/are sealed prior to illumination with actinic radiation. Sealing the fiber ends has the advantage of maintaining the pressure of protection gas or maintaining the low background pressure established through evacuation. Sealing the fiber ends further prevents in-diffusion of moisture. In case of photo-sensitizing loading, sealing the fiber end(s) has the further advantage of limiting out-diffusion of molecular hydrogen or deuterium after loading, e.g. during the UV-writing process. Furthermore, during and after cold storage of the loaded fiber, sealing of the ends prevents condensation in the vicinity of the ends of moisture that could otherwise have diffused into un-sealed holes in the micro-structured fiber.

Preferably, step (a2) is carried out after step (a1).

An object of the invention is achieved by a method of producing refractive index structures in micro-structured fiber by illumination with actinic radiation, the micro-structured fiber comprising elongated holes along at least a part of its length and having at least one open end where the holes are accessible, the method comprising the step (a2) of providing that the open end or ends is/are sealed prior to illumination with actinic radiation.

Sealing the fiber ends prevents in-diffusion of moisture. In case of photo-sensitizing loading, sealing the fiber ends has the further advantage of limiting out-diffusion of molecular hydrogen or deuterium after loading, e.g. during the UV-writing process. Furthermore, during and after cold storage of the loaded fiber, sealing of the ends prevents condensation in the vicinity of the ends of moisture that could otherwise have diffused into un-sealed holes in the micro-structured fiber.

In a particular embodiment, the method further comprises the step of (a3) providing a photo-sensitizing loading of the micro-structured fiber with a substance comprising hydrogen and/or deuterium prior to illumination with actinic radiation. This has the advantage of providing an enhanced photo-sensitivity.

Preferably, step (a3) is carried out after step (a2). Advantageously, the steps are performed in the order (a1), (a2), (a3). In this way hydrogen or deuterium present in the holes after photosensitizing loading will not react with atmospheric oxygen to form water. Water formed this way would otherwise seriously impair the grating formation process. Bragg gratings or other refractive index structures can thus be fabricated with high quality and predictable specifications in micro-structured fiber.

In the present context, the term 'actinic radiation' is taken to mean any electromagnetic radiation that can produce photochemical reactions in a given substance (the substance optionally comprising a specially photosensitive agent, e.g. a dopant). In an embodiment the actinic radiation used for illumination of the micro-structured optical fiber comprises UV-radiation. Alternatively actinic radiation of other wavelengths might just as well be used (in a continuous of pulsed form), possibly in combination with appropriately selected photosensitive dopant materials.

In an embodiment of the invention, the micro-structured fibre comprises at least one photosensitive dopant for modifying the refractive index profile of the region(s) in question by exposure to light (e.g. in the core and/or cladding regions). In a particular embodiment, said photosensitive dopant(s) is/are selected among the group of elements consisting of Ge, B, N, Sn, and combinations thereof. This provides an improved sensitivity to modifying the refractive index of the micro-structured fiber, e.g. over a part of its length to introduce a frequency selective element, such as a Bragg grating (cf. e.g. U.S. Pat. No. 6,151,429, FIG. 5 and the corresponding discussion). In an embodiment of the invention, the micro-structured fiber is silica-based and the guiding region or regions of the fiber contain(s) germanium (Ge) and/or boron (B), which may preferably be used together.

Advantageously, a substance comprising molecular hydrogen or deuterium, such as $H_2$ or $D_2$, is used for the photosensitizing loading.

In an embodiment, the purging of the holes of the micro-structured fiber in step (a1) provides that the volume of the hole after the purging contains less than 10% oxygen (mole concentration), such as less than 1% oxygen, such as less than 0.1% oxygen, such as less than 0.01% oxygen, such as less than 0.001% oxygen.

The oxygen concentration in the protection gas and/or in the hole volume of the micro-structured fiber can e.g. be measured by conventional mass spectroscopy-based gas composition analysis methods (cf. e.g. the book of W. M. A Niessen, "Current practice of gas chromatography—mass spectrometry", Dekker, 2001, ISBN 0-8247-0473-8). The actual method used should be chosen with a view to the expected concentration of oxygen present in the volume.

In one aspect, the method of the invention thus removes oxygen and other harmful gases from the holes of micro-structured fiber prior to molecular hydrogen or deuterium loading by flushing the fiber for a sufficient amount of time with an oxygen free gas and finally closing the holes at the ends of the fiber. Thereby the holes will be filled with a mixture of oxygen free gas and $H_2$ or $D_2$ and, ideally, no undesired reactions will take place under the influence of actinic radiation.

In a particular embodiment, the protection gas is totally free of oxygen. The term 'totally free of oxygen' is in the present context taken to mean that the amount of $O_2$ present in the protection gas is less than 10 ppm.

In a particular embodiment, the protection gas is inert to the material of the fiber. In other words, the protection gas is essentially chemically inactive to the material of the fiber. This has the advantage of minimizing the formation of undesired reactants.

In a particular embodiment, the protection gas is inert to the loading substance. In other words, the protection gas is essentially chemically inactive to the loading substance. In a particular embodiment, the protection gas is inert to loaded molecules under the conditions of the loading.

The refractive index structure may in general constitute any induced spatial change in refractive index over the length and/or cross section of the micro-structured fibre.

In a particular embodiment, the refractive index structure comprises a fiber Bragg grating. This has the advantage of facilitating the provision of fibre lasers such as DBR or DFB fiber lasers. The properties and physical implementation of a Bragg grating in a non-micro-structured optical fibre have been extensively described, cf. e.g. WO-98/36300.

In a particular embodiment, the refractive index structure comprises a long period grating. This has the advantage of providing optical power loss in spectrally confined regions (providing an attenuating filter-action) (cf. [Kashyap], pp. 171 ff. or [Othonos, Kalli], pp. 142 ff.).

In a particular embodiment, the refractive index structure provides a uniform refractive index shift. This has the advantage of providing an optical phase shift in the fiber.

In a particular embodiment, the micro-structured fiber is a double clad fiber, i.e. e.g. a fiber comprising a core and first and second cladding regions, wherein the first (inner) cladding region can act as a secondary core, e.g. for propagating pump light for exciting an optically active material incorporated in the fiber, e.g. in the core. This has the advantage of facilitating a fibre laser system that is suitable for high-power applications.

In a particular embodiment, the micro-structured fiber is an air-clad optical fiber. In the present context, the term an 'air-clad' fibre is taken to mean a micro-structured fibre wherein light to be propagated is confined to a part of the fibre within a circumferential distribution of longitudinally extending voids in the cladding of the fibre, cf. e.g. U.S. Pat. No. 5,907,652 or WO-03/019257.

In a particular embodiment, the micro-structured fiber is an air-guide optical fiber with photonic band gap guidance. An air-guide or hollow core optical fiber is taken to mean a micro-structured optical fibre wherein a major part of the optical field intensity is carried in an air (or hollow) core, cf. e.g. Knight et al. in Science, vol. 282, 20 Nov. 1998, pp. 1476-1478 or WO-99/64903. Light guidance in a micro-structured optical fiber due to photonic band gap effects is e.g. discussed in Birks et al., '2D Photonic Band Gap Structures in Fibre Form', in 'Photonic Band Gap Materials, Ed. by C. M. Soukoulis, Kluwer, 1996, pp. 1-8.

In a particular embodiment, the protection gas comprises one or more noble gasses, preferably the protection gas being selected from the group of He, Ne, Ar, Kr, Xe, Rn, and mixtures thereof.

In a particular embodiment, the protection gas is nitrogen, $N_2$. This has the advantage of providing a protection gas that is readily available and economic in use.

In general, the purging time (e.g. the flushing time), the flow rate, pressure, etc. should be adapted to the particular configuration, such as to the protection gas used, to the number of and dimensions of the holes in the micro-structured fiber, to the length of the fiber section to be processed, etc.

In a particular embodiment, photo-sensitizing loading comprises the step of subjecting the fiber to prolonged exposure to molecular hydrogen or molecular deuterium at a pressure sufficiently high to perform a loading.

In a particular embodiment, the photo-sensitizing loading is partly or totally performed at temperature above room temperature (T>25° C.). This has the advantage that the diffusivity of the loading gas increases with temperature thus providing for faster loading times.

A micro-structured optical fiber comprising a refractive index structure produced by the method described above and in the detailed description and an article comprising such micro-structured optical fibre are furthermore provided by the present invention.

An aspect of the invention is e.g. embodied in an article (such as a fiber laser or a fiber sensor) that comprises one or more fiber Bragg gratings or long period gratings or other induced (e.g. by UV-illumination) refractive index structure in micro-structured fiber and where the material properties of the micro-structured fiber require or makes it advantageous to use loading with $H_2$ or $D_2$ to enhance the photosensitivity. Such loading process with molecular hydrogen or deuterium will normally create a mixture of atmospheric oxygen with molecular hydrogen or deuterium that may react under the influence of UV-light or other actinic radiation to form water ($H_2O$) or heavy water ($D_2O$) in the holes. Water in the holes adversely affects the process of grating formation. UV-written structures in a micro-structured fiber according to the invention are in an embodiment fabricated by purging the holes in the micro-structured fiber with a protective (e.g. an inert) gas until they are essentially free of oxygen prior to loading with molecular hydrogen or deuterium. When the purge process is complete (i.e. when essentially no oxygen is left in the holes of the micro-structured fiber) the ends of the micro-structured fiber are sealed by application of a fusion arc, by other form of heating and melting, by mechanical sealing or by other similar means of closing the ends. During the process of loading with molecular hydrogen or deuterium the purged and sealed micro-structured fiber will be subjected to a high pressure of molecular hydrogen or deuterium at either room temperature or at elevated temperatures. Molecular hydrogen or deuterium will diffuse into the fiber matrix and over time—depending on the temperature—an equilibrium partial pressure of molecular hydrogen or deuterium will be established in the fiber. Molecular hydrogen or deuterium will mix with the inert gas in the holes. During the subsequent UV-illumination process the absence of oxygen will render the gas-mixture in the holes inert and grating formation can progress in a manner similar to that in solid fiber.

Alternatively, UV-written structures in micro-structured fiber according to an embodiment of an aspect of the invention are fabricated by sealing the ends of the micro-structured fiber by application of a fusion arc, by other form of heating and melting, by mechanical sealing or by other similar means of closing the ends prior to loading with molecular hydrogen or deuterium. This has the advantage of limiting out-diffusion of molecular hydrogen or deuterium after loading, e.g. during the UV-writing process. Furthermore, during and after cold storage of the loaded fiber, sealing of the ends prevents condensation in the vicinity of the ends of moisture that could otherwise have diffused into un-sealed holes in the micro-structured fiber.

Details of the loading process, including examples of loading pressures, temperatures and times are given in U.S. Pat. No. 5,235,659.

In a particular embodiment, the article is a fiber laser comprising a micro-structured fiber with at least one fiber Bragg grating, a pump radiation source, and a means for coupling pump radiation into the micro-structured fiber.

In a particular embodiment, the article is a cladding pumped fiber laser comprising a micro-structured fiber with at least one fiber Bragg grating, a pump radiation source, and a means for coupling pump radiation into the micro-structured fiber (e.g. into the inner cladding).

In a particular embodiment, the article is a fiber sensor.

Further objects of the invention are achieved by the embodiments defined in the dependent claims and in the detailed description of the invention.

It should be emphasized that the term "comprises/comprising" when used in this specification is taken to specify the presence of stated features, integers, steps or components but does not preclude the presence or addition of one or more other stated features, integers, steps, components or groups thereof.

DETAILED DESCRIPTION OF PREFERRED EMBODIMENTS

Figure 1:
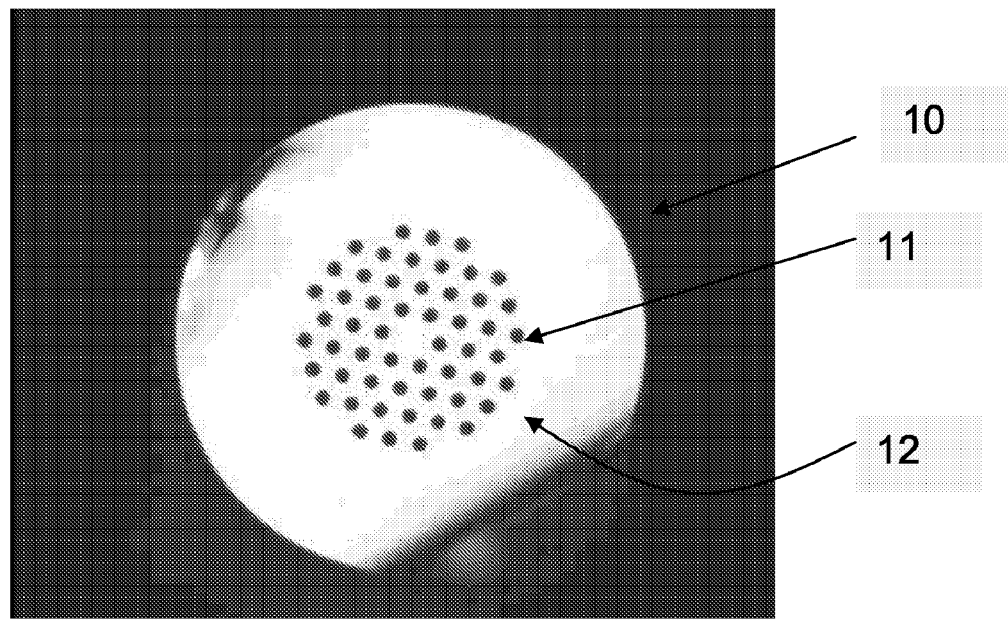
FIG. 1 illustrates an example of a micro-structured fiber that would require inert gas flushing prior to loading to avoid water formation in the holes.

FIG. 1 showing a photo of an end facet 12 of a micro-structured optical fiber 10 illustrates the problem encountered when attempting to UV-imprint fiber Bragg gratings or other UV-induced structures in micro-structured fiber: the presence of air holes 11 in the micro-structured fiber 10, generally implies the existence of oxygen at atmospheric pressure. For fiber that has been loaded with hydrogen or deuterium to obtain sufficient photo-sensitivity, the holes will contain a mixture of oxygen and hydrogen or deuterium during the UV-writing process. UV-light—or potentially other actinic radiation—will cause a reaction between oxygen and hydrogen or deuterium to create either normal or heavy water. The presence of water in the path of the actinic radiation will attenuate its intensity as well as distort its phase-front with detrimental results for sub-micron, interferometrically defined structures such as fiber Bragg gratings, as well as for other UV-imprinted structures.

Figure 2:
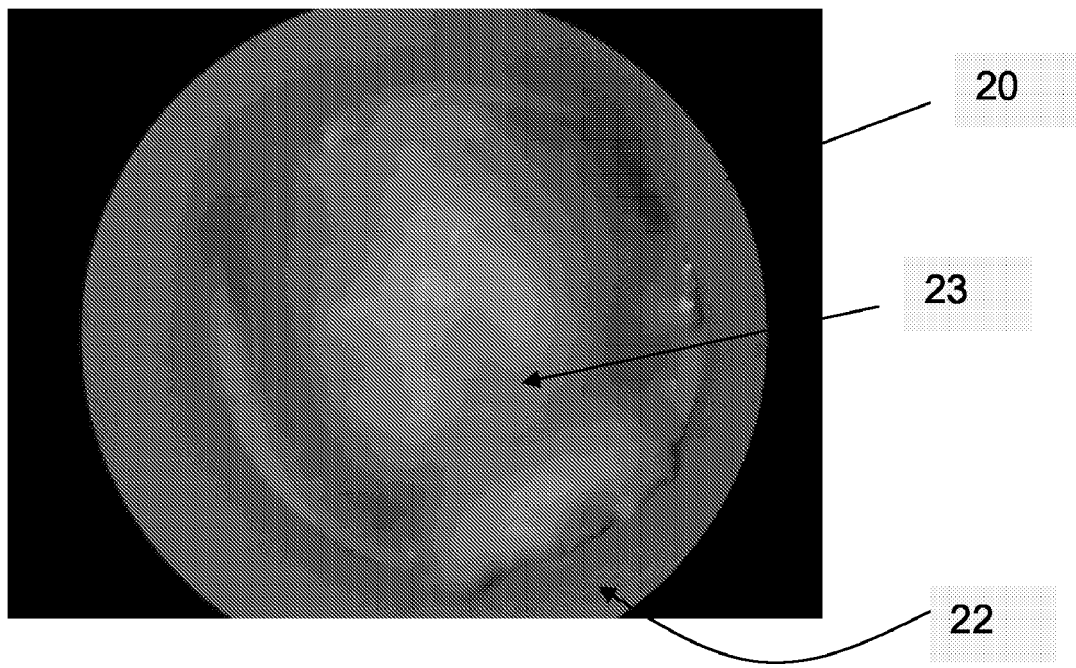
FIG. 2 illustrates water ($D_2O$) covering the holes in a micro-structured fiber. The fiber was loaded with $D_2$—without inert gas flushing and sealing—and subsequently illuminated by UV-light in an attempt to write a grating.

FIG. 2 shows a photo of an end facet 22 of a micro-structured fiber 20 similar to that of FIG. 1 where the holes are covered with water ($D_2O$) 23. The fiber was first loaded with $D_2$ at a pressure of approximately 150 bar at a temperature of approximately 80° C. for approximately 24 hours. The fiber was not subjected to inert gas flushing and sealing. Subsequently the fiber was illuminated by UV-light at 248 nm in an attempt to write a grating. The water produced in the UV-illuminated region was transported to the fiber end facet 22 by application of an overpressure of gas at the opposite end.

Figure 3:
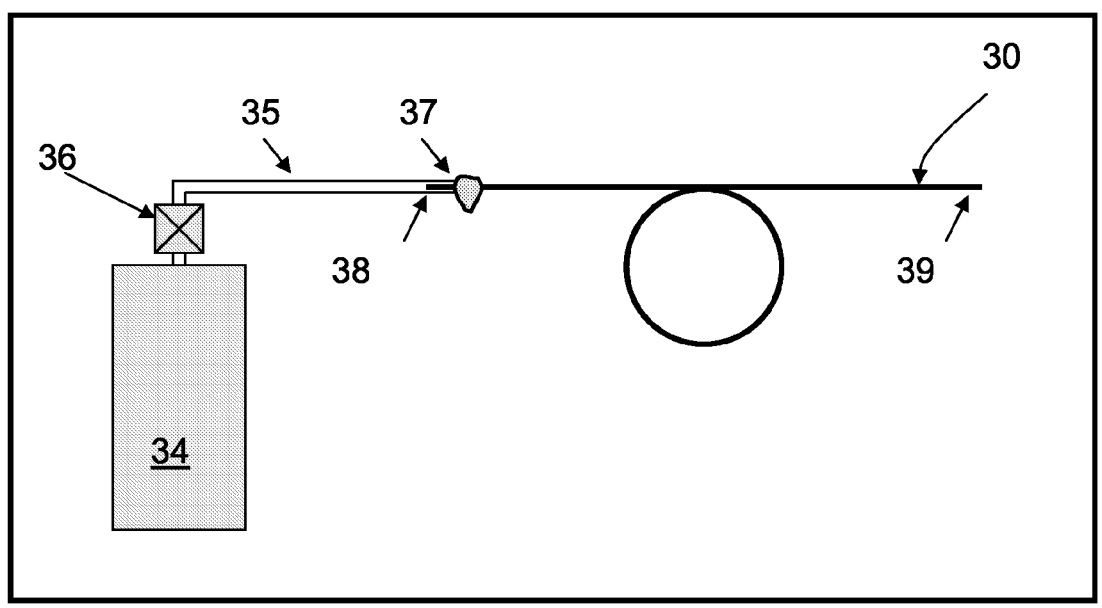
FIG. 3 illustrates an example of a setup for flushing and sealing a micro-structured fiber.

FIG. 3 illustrates how the fiber 30 can be flushed by applying pressure of a protective gas, e.g. He from a pressure bottle 34 via a suitable tube 35 and valve 36. The tube 35 needs to have a sufficiently small inner diameter that it fits over the micro-structured fiber 30 and can be easily sealed 37, e.g. by gluing the tube to the end of the micro-structured fiber. Inert gas pressure is applied for a sufficient amount of time that the holes in the micro-structured fiber have been purged of all oxygen and filled with inert gas. The time required depends on the inert gas pressure and the flow resistance of the holes, which again depends on the area of the holes and the length of fiber. At the end of the flushing process the holes are sealed at each open end 38, 39 either mechanically by application of a suitable sealant (e.g. glue) or by collapsing the holes through application of heat either using a fusion arc (e.g. from a splicer) or other means of local heating and melting. In an embodiment, the purging process thus comprises the steps of Connecting a first open end of the micro-structured optical fiber to a source of a pressurized protective, e.g. inert, gas Flushing the holes of the fiber with the protective gas Sealing the second open end Sealing the first open end connected to the protective gas source.

Alternatively, the second open end 39 may be initially sealed and a pump connected to the first open end 38 (instead of the source of pressurized protective gas 34 in FIG. 3). The holes may subsequently be evacuated to provide an appropriate pressure. Finally, the first open end may be sealed.

Example 1

A fiber Bragg grating was made by first He-flushing a micro-structured fiber: a He-pressure bottle was connected to the holes of the micro-structured fiber via a plastic tube with low inner diameter to fit closely over the fiber. The opening between tube and fiber outer diameter was sealed using acrylate glue. The other end of the approximately 3 meter long fiber was left open. He at a pressure of 5 bar was applied for approximately 24 hours. This rather long time span was required due to the high flow resistance presented by the small size holes of the micro-structured fiber. At the end of the flushing process the open end of the fiber was sealed using acrylate glue. Subsequently the other end was sealed in the same manner, and the fiber was placed in a deuterium loading chamber at a $D_2$ pressure of approximately 150 bar and a temperature of approximately 80° C. for approximately 24 hours. After deuterium loading a fiber Bragg grating was UV-written in the fiber using a uniform phasemask and 248 nm light from an KrF excimer laser. A grating with predictable transmission and reflection properties resulted. This grating was used as the high reflector in a high power fiber laser.

Example 2

A fiber Bragg grating was made as described in EXAMPLE 1, only without performing the step of flushing the holes of the micro-structured fiber with a protective gas prior to the sealing of the ends of the fiber.

Example 3

A fiber Bragg grating was made as described in EXAMPLE 1, only substituting the step of flushing the holes of the micro-structured fiber with a protective gas with the step of evacuating of the holes to a pressure of 0.001 atm.

The manufacturing of micro-structured optical fibres is e.g. discussed in Bjarklev et al., 'Photonic Crystal Fibres, Kluwer Academic Publishers, 2003, Chapter 4, pp. 115-130.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

The invention claimed is:

1. A method of producing refractive index structures in a micro-structured fiber by illumination with actinic radiation, the micro-structured fiber comprising elongated holes along at least a part of its length and having at least one open end where the holes are accessible, the method comprising:
providing a photo-sensitizing loading of the micro-structured fiber with a substance comprising hydrogen or deuterium or both prior to illumination with actinic radiation;
sealing the at least one open end of said micro-structured fiber;
subjecting the loaded micro-structured fiber to cold storage subsequent to said sealing; and
producing refractive index structures in the sealed loaded micro-structured fiber by illuminating with actinic radiation subsequent to said cold storage.

2. The method according to claim 1 wherein said providing a photo-sensitizing loading of the micro-structured fiber with a substance comprising hydrogen or deuterium or both prior to illumination with actinic radiation is carried out after said sealing.

3. The method according to claim 1 wherein the illumination with actinic radiation comprises illumination with ultraviolet light.

4. The method according to claim 1, wherein the refractive index structure comprises a fiber Bragg grating.

5. The method according to claim 1, wherein the refractive index structure comprises a long period grating.

6. The method according to claim 1, wherein the refractive index structure comprises a uniform refractive index shift.

7. The method according to claim 1, wherein the micro-structured fiber is a double clad optical fiber.

8. The method according to claim 1, wherein the micro-structured fiber is an air-clad optical fiber.

9. The method according to claim 1, wherein the micro-structured fiber is an air-guide or hollow core optical fiber with photonic bandgap guidance.

10. The method according to claim 2, wherein the providing a photo-sensitizing loading comprises subjecting the fiber to prolonged exposure to of molecular hydrogen or molecular deuterium at a pressure sufficiently high to perform a loading.

11. The method according to claim 2, wherein the photo-sensitizing loading is partly or totally performed at temperatures above 25° C.

12. A micro-structured fiber with a refractive index structure obtained by the method as defined in claim 1.

13. An article comprising the micro-structured fiber according to claim 12.

14. The article according to claim 13, wherein the article is a fiber laser and the micro-structured fiber has at least one fiber Bragg grating, said laser further comprising a pump radiation source coupled to the micro-structured fiber.

15. The article according to claim 13, wherein the article is a cladding pumped fiber laser and the micro-structured fiber has at least one fiber Bragg grating, said cladding pumped fiber laser further comprising a pump radiation source coupled to the micro-structured fiber.

16. An article according to claim 13 wherein the article is a fiber sensor.

17. The method according to claim 1, further comprising purging with a protection gas essentially free of oxygen or evacuating the holes prior to sealing the at least one open end.

* * * * *